F. S. YALE.
AUTOMOBILE ENGINE.
APPLICATION FILED MAR. 23, 1909.

999,941.

Patented Aug. 8, 1911.

Witnesses
Ger Schwarz
Edward F. Roehm

Inventor
Fred. S. Yale
By his Attorney
Redding Greeley Austin

UNITED STATES PATENT OFFICE.

FRED S. YALE, OF NEW YORK, N. Y.

AUTOMOBILE-ENGINE.

999,941.

Specification of Letters Patent.   Patented Aug. 8, 1911.

Application filed March 23, 1909. Serial No. 485,212.

*To all whom it may concern:*

Be it known that I, FRED S. YALE, a citizen of the United States, residing in the borough of Queens of the city of New York, in the State of New York, have invented certain new and useful Improvements in Automobile-Engines, of which the following is a specification, reference being had to the accompanying drawing, forming a part hereof.

The object of my invention is to provide means whereby the excessive noise caused by improper adjustment between the valve stem and the push rod of an automobile engine may be eliminated, and further consists in means whereby excessive wear between these parts may be readily and easily corrected.

The further objects thereof will be hereinafter more fully set forth in the description of the invention which consists in the new and novel features of construction and combinations of parts hereinafter set forth and claimed.

Figure 1:
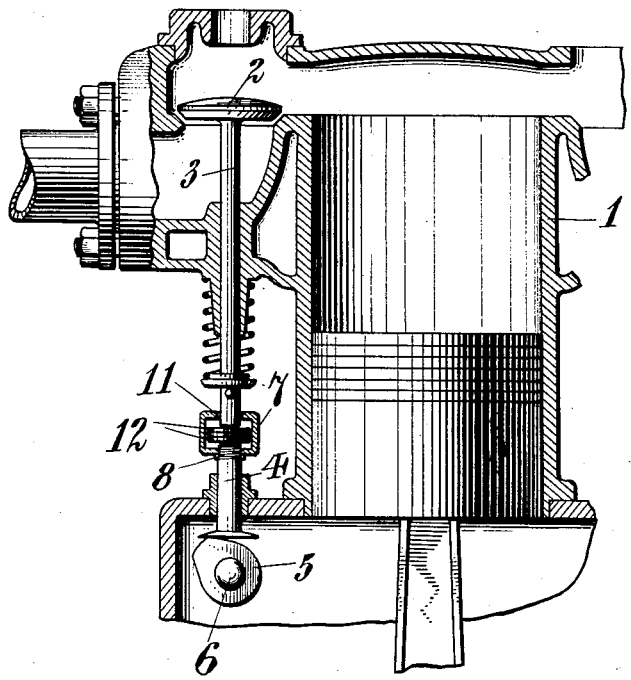
Figure 3:
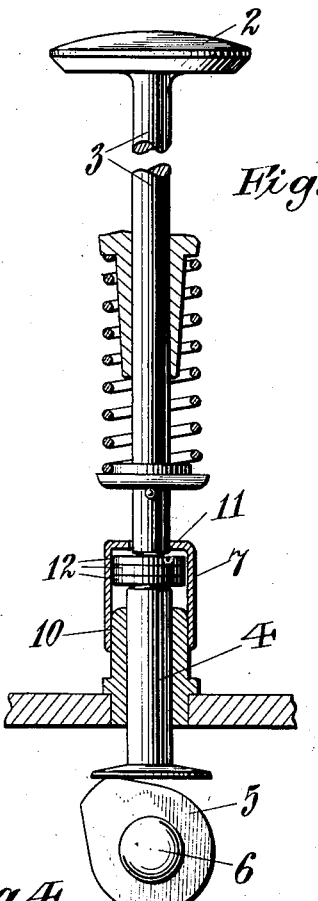
Figure 2:
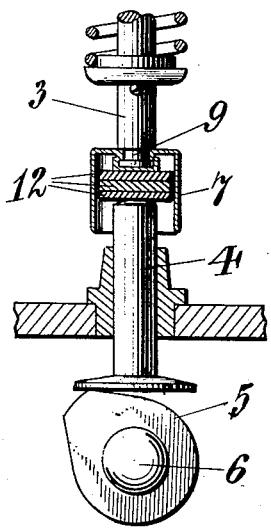
Figure 4:
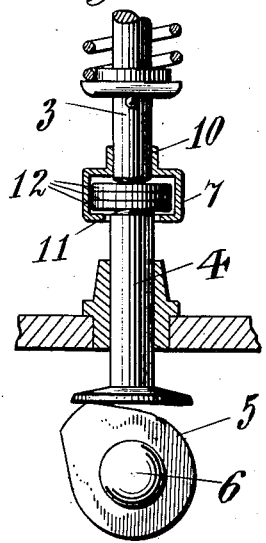
Figure 5:
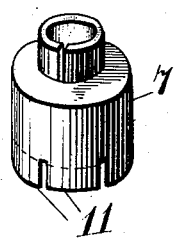

In the accompanying drawings Figure 1 is a vertical section through part of an automobile engine embodying my invention. Figs. 2, 3 and 4 are detail views showing the valve stem and push rod of an automobile engine provided with my improvement Fig. 5 is a detail view showing one form of the holder or ferrule.

The engine 1 may be of any well known construction and is provided in the usual manner with a valve 2 having a stem 3. Said valve is actuated by a push rod 4 which is normally held in contact with a cam 5 upon the crank shaft 6 of the engine in the usual manner. Said push rod usually engages directly with the valve stem 3 when it is actuated by the cam 5, and it is obvious that in the case of improper adjustment the intermittent movement of the end of said push rod against the end of the valve stem will give rise to considerable noise and will cause excessive wear between these parts.

In order to overcome these objections a holder or ferrule 7 is mounted on one of said parts by any suitable means, as by a screw thread 8 (as shown in Fig. 1) or by being secured in a groove 9 (as shown in Fig. 2) or by frictional contact as at 10 (as shown in Fig. 4). The wall of said holder is preferably of yielding material whereby the edge may be bent over to form a retaining lip 11.

Arranged within the holder and between the adjacent ends of the valve stem and the push rod are one or more metal disks 12, which are hardened, particularly the centers thereof, to withstand the wear. Said disks are preferably circular in outline and are allowed free movement within the holder. Said disks normally rest upon the top of the push rod and form spacing members so that the distance between the valve stem and the push rod may be accurately regulated.

In order to apply the holder and the spacing disks to either the valve stem or the push rod, the disks are first placed within the holder and the valve stem is then lifted against the tension of the spring and the holder is mounted on one of said parts, either the valve stem or the push rod. The throat of the holder is then threaded or clamped onto the part holding the same and the lip 10 may, if desired, be bent over to hold the disks in place. In order to remove the holder for the purpose of adding or replacing spacing disks, the valve stem is held against the tension of the spring and the holder with the disks inclosed is removed. Additional disks may be inserted by bending back the holding lip and the holder can then be replaced as described.

By this construction the noise due to improper adjustment or to wear between the valve stem and the push rod may be eliminated and the space between the two parts may be regulated. This construction also provides suitable means for regulating the amount of travel of the valve.

I claim as my invention:

1. In an automobile engine, the combination of a valve stem and a push rod, of a separate disk normally seating on the end of said push rod and movable independently thereof, and a holder mounted on the valve stem engaging the disk to prevent displacement thereof and provided with a central passage permitting said valve stem to contact directly with said disk, substantially as described.

2. In an automobile engine, the combination with a valve stem and a push rod, of a holder secured to one of said parts, a spacing disk within the holder and arranged between said valve stem and push rod, said holder being provided with yielding sides adapted to be bent over to form a flange engaging said disks and hold same against displacement, substantially as described.

This specification signed and witnessed this 17th day of March, A. D., 1909.

FRED S. YALE.

Signed in the presence of—
GEO. A. MARSHALL,
MARGARET W. BEST.